US012693261B2

(12) United States Patent
Rajasekharan et al.

(10) Patent No.: US 12,693,261 B2
(45) Date of Patent: Jul. 28, 2026

(54) DYNAMIC END-POINT TOTAL ORGANIC FLUORIDE MEASUREMENT

(71) Applicant: Hach Company, Loveland, CO (US)

(72) Inventors: Vishnu Vardhanan Rajasekharan, Fort Collins, CO (US); Matthew Ryan Salzer, Loveland, CO (US); Russell Young, Fort Collins, CO (US); Benjamin James Walter, Fort Collins, CO (US); Jorge Gomez, Fort Collins, CO (US)

(73) Assignee: Hach Company, Loveland, CO (US)

( * ) Notice: Subject to any disclaimer, the term of this patent is extended or adjusted under 35 U.S.C. 154(b) by 820 days.

(21) Appl. No.: 17/951,777

(22) Filed: Sep. 23, 2022

(65) Prior Publication Data

US 2024/0102960 A1     Mar. 28, 2024

(51) Int. Cl.
*G01N 27/416* (2006.01)
*G01N 27/30* (2006.01)

(52) U.S. Cl.
CPC ....... *G01N 27/4163* (2013.01); *G01N 27/308* (2013.01)

(58) Field of Classification Search
CPC .. G01N 27/4163; G01N 27/308; G01N 27/28; G01N 27/333; G01N 31/005; G01N 33/1826; C02F 2001/46142; C02F 2001/46147; C02F 2001/36; C02F 2103/343; C02F 2305/023; C02F 1/461
See application file for complete search history.

(56) References Cited

U.S. PATENT DOCUMENTS

| | | | | |
|---|---|---|---|---|
| 2013/0281607 A1* | 10/2013 | Hintzer | ................... | C02F 1/461 |
| | | | | 524/544 |
| 2018/0289333 A1* | 10/2018 | Kamath | ............... | A61B 5/6848 |
| 2019/0185352 A1* | 6/2019 | Chiang | ................ | C02F 1/4672 |

(Continued)

OTHER PUBLICATIONS

Maldonado et al., A flow-through cell for the electrochemical oxidation of perfluoroalkyl substances in landfill leachates, Journal of water process engineering, 2021, 43, 102210 (Year: 2021).*

(Continued)

*Primary Examiner* — Shizhi Qian
(74) *Attorney, Agent, or Firm* — FERENCE & ASSOCIATES LLC

(57) ABSTRACT

An embodiment provides a method for measuring an amount of total organic fluoride content of a PFAS containing sample, including: placing a sample comprising a PFAS compound in a measurement device, wherein the measurement device comprises an oxidation cell and a non-oxidation cell, wherein the oxidation cell comprises a boron-doped diamond electrode; measuring, using the measurement device, an amount of total inorganic fluoride of the sample before an oxidation; applying an electrical potential to a portion of the sample in the oxidation cell, wherein the electrical potential oxidizes the PFAS compound; measuring, using the measurement device, an amount of total organic fluoride of the sample after the oxidation to provide a measurement signal of the total organic fluoride; and determining a first derivative of the measurement signal of the total organic fluoride. Other aspects are described and claimed.

17 Claims, 6 Drawing Sheets

(56) References Cited

U.S. PATENT DOCUMENTS

| | | | |
|---|---|---|---|
| 2021/0116415 A1* | 4/2021 | Rajasekharan | G01N 33/1846 |
| 2021/0262981 A1* | 8/2021 | Carbonelli | G01N 33/0034 |
| 2022/0187197 A1 | 6/2022 | Rajasekharan et al. | |
| 2022/0402794 A1* | 12/2022 | Chen | C02F 1/008 |
| 2024/0219386 A1* | 7/2024 | Jaramillo Botero | G01N 33/49 |

OTHER PUBLICATIONS

Maldonado et al., Supporting Information of a flow-through cell for the electrochemical oxidation of perfluoroalkyl substances in landfill leachates, Journal of water process engineering, 2021, 43, 102210 (Year: 2021).*

Yanagida et al., Using Electrochemical Oxidation to Remove PFAS in Simulated Investigation-Derived Waste (IDW): Laboratory and Pilot-Scale Experiments, Water, 2022, 14, 2708 (Year: 2022).*

Hu et al., Autocatalytic degradation of perfluorooctanoic acid in a permanganate-ultrasonic system, Water research, 2018, 140, 148-157 (Year: 2018).*

Skinn et al., Pulsed-waveform electrocatalytic remediation of PFAS-contaminated aqueous streams, the 240th ECS meeting , Oct. 11, 2021 (Year: 2021).*

Plugotarenko et al., Comparative Analysis of Derivative Parameters of Chemoresistive Sensor Signals for Gas Concentration Estimation, Chemosensors, 2022, 10, 126 (Year: 2022).*

International Search Report and Written Opinion, European Patent Office, Dec. 5, 2023, 21 pages, European Patent Office.

Xiuping Zhu et al., "Advanced treatment of biologically pretreated coking wastewater by electrochemical oxidation using boron-doped diamond electrodes", Jun. 23, 2009, 9 pages, Elsevier Ltd.

Jerry Goodisman et al., "Conductivity of Irradiated Pure Water", J. Phys. Chem. A, 2000, 16 pages, American Chemical Society.

Janice Stonebridge et al., "Fluoride-Selective Electrode as a Tool to Evaluate the Degradation of PFAS in Groundwater: A Bench-Scale Investigation", Groundwater Monitoring & Remediation, Apr. 20, 2020, 4 pages.

* cited by examiner

ISE holder

Reservoir for isothermal conditions

Contacts for Faster equilibrium

Sample Flow Port

Sample Flow Port

DYNAMIC END-POINT TOTAL ORGANIC FLUORIDE MEASUREMENT

FIELD

This application relates generally to measurement of the total organic and inorganic fluoride in a sample, and, more particularly, to measurement of the total organic and inorganic fluoride in a sample using a boron-doped diamond oxidation cell and a fluoride ion-selective electrode.

BACKGROUND

Ensuring water quality is critical in a number of industries such as drinking water, waste water treatment and reuse, pharmaceuticals, and other manufacturing fields. Additionally, ensuring water quality is critical to the health and well-being of humans, animals, and plants which are reliant on the water for survival. Per and polyfluoroalkyl substances (PFAS), are a large class of synthetic chemicals that impacts public health at ultra-low levels. Governments and regulating agencies have set limits on PFAS concentration. Such limits may be set upon the PFAS compounds in surface water, ground water, wastewater, biosolids, and soils. Several industries that use or have used PFOS/PFOA are replacing with alkyl fluoro substitutes which still are of concern.

BRIEF SUMMARY

In summary, one embodiment provides a method for measuring an amount of total organic fluoride content of a PFAS containing sample, including: placing a sample comprising a PFAS compound in a measurement device, wherein the measurement device comprises an oxidation cell and a non-oxidation cell, wherein the oxidation cell comprises a boron-doped diamond electrode; measuring, using the measurement device, an amount of total inorganic fluoride of the sample before an oxidation; applying an electrical potential to a portion of the sample in the oxidation cell, wherein the electrical potential oxidizes the PFAS compound; measuring, using the measurement device, an amount of total organic fluoride of the sample after the oxidation to provide a measurement signal of the total organic fluoride; and determining a first derivative of the measurement signal of the total organic fluoride.

Another embodiment provides a method for measuring an amount of an analyte in a sample, including: placing a sample in a measurement device, wherein the measurement device comprises an oxidation cell and a non-oxidation cell, wherein the oxidation cell comprises a boron-doped diamond electrode; measuring, using the measurement device, an amount of a first component of the sample before an oxidation, wherein an ion selective electrode measures the first component; applying an electrical potential to a portion of the sample in the oxidation cell, wherein the electrical potential oxidizes the sample; and measuring, using the measurement device, an amount of a second component of the sample after the oxidation, wherein another ion selective electrode measures the second component.

A further embodiment provides a device for measuring an amount of total organic fluoride content of PFAS compounds in a sample, including: a non-oxidation cell; an oxidation cell comprising an ion selective electrode and a boron-doped diamond electrode; a processor; the device for measuring an amount of fluoride content of a PFAS compound in a sample being configured to: measure, using the measurement device, an amount of total inorganic fluoride of the sample before an oxidation; apply an electrical potential to a portion of the sample in the oxidation cell, wherein the electrical potential oxidizes the PFAS compound; measure, using the measurement device, an amount of total organic fluoride of the sample after the oxidation to provide a measurement signal of the total organic fluoride; and determine a first derivative of the measurement signal of the total organic fluoride.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
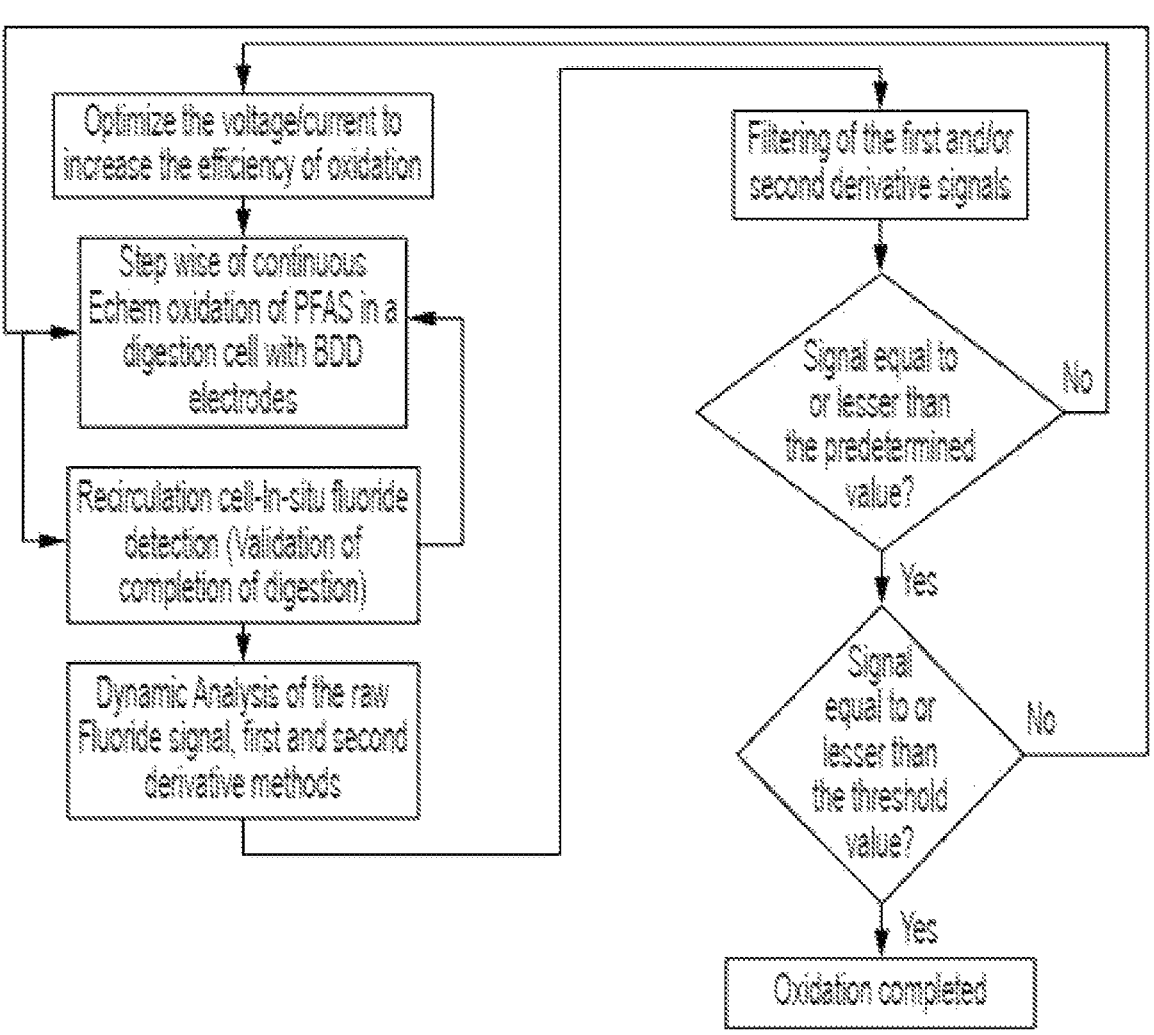
FIG. 1 illustrates a flow diagram for a dynamic end point detection.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

Per and polyfluoroalkyl substances (PFAS) are a large class of synthetic chemicals that impacts public health at ultra-low levels, even in the range of part-per-trillion (ppt). The current Environmental Protection Agency in the United States health advisory states 70 ng/L maximum for PFOS and PFOA in drinking water and recommends total organic fluoride (TOF) at 1 µg/L as a surrogate measurement of fluorine compounds in surface water, ground water, wastewater, biosolids and soils. Other governments have mandated regulatory limits for PFAS compounds. Significant investment is made by treatment plants to achieve these limits. Many of these treatment methodologies are not entirely validated. Several industries that used PFOS/PFOA are replacing with alkyl fluoro substitutes, and these replacements remain a health and environmental concern. Very few high-end lab methods are approved by agencies for PFAS analysis. No technologies exist for analyzing PFAS in field settings. In many cases field analysis of these parameters is impractical due to the complex sample preparation needed in the existing methods.

There are many challenges to TOF measurement which may be critical for detection of per and polyfluoroalkyl substances. For example, a method and system require an ultra-low-level detection of a diverse set of compounds. The PFAS compounds have a widespread presence in the environment. The difficulty of degradation of larger molecules to recalcitrant smaller ones, precursor transformations, changes in the chemical structure after discharge from an industry or during the leaching process from a landfill, and high background during the analysis of TOF since most tap water has 0.5 to 1 ppm inorganic fluoride anion background from city treatment. Additionally, there are a wide variety of locations and conditions to be tested such as military bases, airports, industrial plants, landfills, firefighting training sites, or the like. Some tests only measure a limited set if targeted chemical and precursors, and fail to identify all PFAS compounds.

Specifically, some methods to detect PFAS compounds have limitations. For example, combustion ion chromatography may have inefficient adsorption of organic and inorganic fluoride activated carbon. The method may have the added step to elute inorganic fluoride eluted from the activated carbon by washing with neutral nitrate solution. There remains a complex process of burning the adsorbable organic fluoride (AOF) loaded activated carbon burnt in an oxygen stream under pyro hydrolytic conditions. This may produce toxic gaseous byproducts of the combusted activated carbon trapped in an absorption medium where corrosive hydrogen fluoride is formed during combustion process. The corrosive hydrogen fluoride is then condensed back into the solution that dissociates to form fluoride anion. A separate aliquot of known volume of the absorbing solution that contains fluoride anion is then injected into an ion chromatograph that is complex in nature by means of a sample injection valve. This requires long cycle times for the halide anions to be separated on the anion separation column of the ion chromatograph (IC). Additionally, conductivity of the eluent needs to be reduced with an anion suppression device prior to the IC conductivity detector where fluoride is measured.

What is needed is an accurate and simpler method for TOF measurement for PFAS analysis. For example, it is advantageous to eliminate the combustion cartridge, to avoid the production of hydrogen fluoride gas in the conventional TOF, and production of oxidants without reagents during the digestion process. Efficiency of hydroxyl radical generation is higher on boron-doped diamond (BDD) electrodes since there is a weak interaction between the radicals and BDD. The robustness of BDD may provide a long-term stability under harsh conditions, high current densities, fluctuating pH, and complex solution matrices. A bipolar electrode configuration may be used to increase oxidation efficiencies PFAS. Treatment efficacy validation can be achieved through this total organic fluoride, and total oxidizable precursor measurements. This may be achieved by digesting the PFAS on BDD electrodes and detecting fluoride electrochemically or optically.

Accordingly, the systems and methods described herein provide a technique for measurement of PFAS and other substances in a sample. In an embodiment, the total organic and inorganic fluoride may be determined in the most efficient manner. The sample solution may be recirculated through a boron-doped diamond (BDD) based oxidation cell and a fluoride ion selective electrode (ISE). Flow, volume, stirring and temperature stabilization module may be measured and optimized for achieving the best performance of ISE under the oxidation process conditions. The fluoride content may be measured in the recirculation cell during the oxidation of the PFAS. The oxidation may be operated in a step wise or continuous mode. Proper shielding techniques may be employed during a continuous oxidation mode to ensure that the ISE signals are not distorted due the higher voltage/current applied to the BDD electrodes. During a step wise oxidation embodiment, the ISE electrode is used between the oxidation steps. The fluoride generation may be monitored during the equilibration time between the oxidation steps. This signal, as measured by an ISE electrode, may then be processed using first and/or second derivative analysis to determine the dynamic end point. The oxidation curve generally consists of an exponential oxidation. The end point may be determined when the curvature becomes insignificant. When the first and/or second derivative falls below a predetermined limit, the end point may be determined. The first derivative analysis may show a higher signal and then become asymptotic to the background slope at the end. The noise may be amplified during the first and second derivative analysis. In an embodiment, appropriate data filtering is required to achieve the best quality signal. Fluoride may be monitored before, during, and after the oxidation. The fluoride content measured before the oxidation may provide the total inorganic fluoride. Once the oxidation is started the fluoride content may increase exponentially due the degradation of the PFAS. It then may reach a stable value the difference between the initial fluoride measurement and this final fluoride value provides the total organic fluoride content. The total of TOF and total inorganic fluoride (TIF) provides the total fluoride value.

The illustrated example embodiments will be best understood by reference to the figures. The following description is intended only by way of example, and simply illustrates certain example embodiments.

In an embodiment, a method and device may measure total organic fluoride in a sample. The sample may be drinking water, industrial effluent, from a natural body of water, or the like. In an embodiment, a boron-doped diamond (BDD) electrode may oxidize PFAS compounds to produce fluoride. The fluoride may be measured using an ion selective electrode (ISE) or other non-invasive techniques like x-ray photoelectron spectroscopy. In an embodiment, the production of fluoride during the oxidation of PFAS may be measured. The system may monitor fluoride production in-situ during oxidation in a BDD electrochemical (Echem) cell.

In an embodiment, the fluoride production from oxidation may start quickly, for example, in an exponential manner. Over time the fluoride production begins to level off or stabilize to an asymptote. In an embodiment, a first derivative and a second derivative may be calculated from the slope of the fluoride production. In an embodiment, and end point of the oxidation may be determined dynamically. For example, at a lower concentration of PFAS or samples containing easily oxidizable compounds, the time required for complete oxidation may be lower, and at a higher PFAS concentration or samples containing harder to oxidize compounds the time required for complete oxidation may be higher. In this manner, the oxidation time may be optimized for time such that an oxidation time is dynamically optimized to a PFAS concentration. As an example, there may be no need to oxidize and wait a long time for a measurement in a sample with a low PFAS concentration. As another example, some PFAS compounds, even at low concentrations, require a longer oxidation. The methods described herein may optimize a time for oxidation to a PFAS compound and/or concentration. Using a fixed time for oxidation may either not oxidize a PFAS compound or may be too long in duration. Using a dynamic end point detection with the first and second derivative, the method may ensure that the oxidation is complete for all PFAS compounds including complex PFAS molecules.

In an embodiment, measuring fluoride generated by the oxidation may provide a feedback loop to the Echem generator of the system. The feedback may increase or decrease voltage or current of the Echem cell depending on a fluoride generation/production curve. In other words, energy usage may be optimized within the system and method. In an embodiment, as the asymptote is reached there may be a small slope remaining. This small slope may measure a background contribution from the cell component or other components contributing to a fluoride signal. In an embodiment, the method and device may measure a pH or carbon dioxide.

In an embodiment, the measurement may be continuous or step-wise. A step-wise may allow a more accurate measurement as the sample may reach homogeneity within the cell or allow the Echem cell to reset. In a continuous measurement, there may be an influence on the electrochemical measurement from the potential applied for oxidation purposes which should be compensated through filtering or shielding techniques.

Referring to FIG. 1, in an embodiment, a flow diagram of dynamic end point detection is illustrated. In an embodiment a set voltage or potential may be used as a starting point. A PFAS compound may be oxidized in a digestion cell. The sample or standard solution may be recirculated during the digestion process. In other words, a mixing or flow may be created in the digestion cell. The recirculation may move a fluid sample between an oxidation cell and a non-oxidation cell. The non-oxidation cell may be free of harsh reagents, such as hydroxyl radicals or other oxidants. An amount of fluoride may be measured in the non-oxidative cell. The measuring may be a continuous measurement. The measurement may also determine the first derivative and second derivative of the fluoride measurement signal. Determination of the first and second derivative of the fluoride measurement signal may create noise. The noise may be an electrical noise. The noise may be filtered using a noise filter which may be a hardware or software component of the measurement system. In an embodiment, after noise filtering, the fluoride measurement signal may be compared to a predetermined threshold. If the signal is below or equal to the predetermined threshold, then the system may proceed to the next step. If the signal is not below or equal to the predetermined threshold, then the method and system may proceed with a step wise continuous electrochemical oxidation of PFAS in a digestion cell using the BDD electrode. The increasing of the oxidation potential or current may increase the efficiency of the oxidation process.

If the predetermined value is reached, then the slope of the increase of the oxidation of PFAS compound and resulting fluoride is achieved, and the method and system may proceed to the next step in which the signal is compared to a threshold value. If the signal is less than or equal to the threshold value, then the oxidation is complete. If the signal is not equal to or less than the threshold value, then the oxidation potential may be adjusted or optimized.

Figure 2:
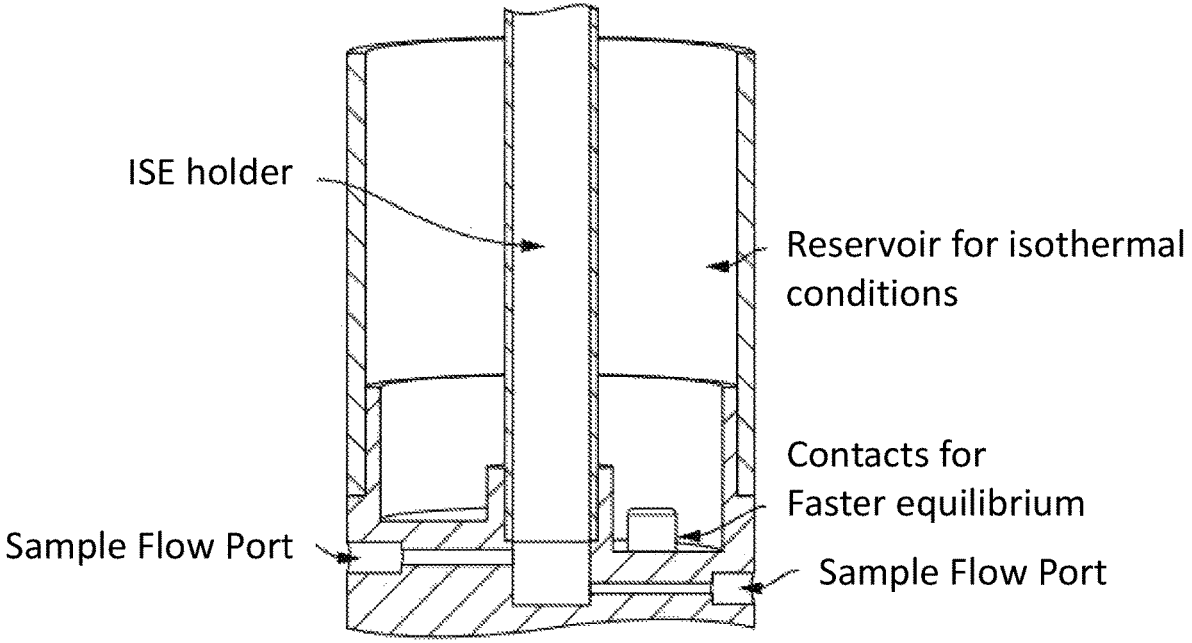
FIG. 2 illustrates an example stabilizing module for a fluoride ion selective electrode in a recirculation path.

Referring to FIG. 2, in an embodiment, a stabilizing module for fluoride ISE recirculation path is illustrated. A non-oxidation cell is illustrated. A sample may be measured using an ISE. The measurement may be for fluoride, pH, carbon dioxide, or the like. The cell may be designed with contacts allowing for a faster thermal equilibrium, and a reservoir for producing isothermal conditions. The cell may have at least one inflow and at least one outflow. The cell may be fluidly connected to an oxidation cell. The sample may be stirred, and the chamber designed to minimize bubble interference near the ISE electrode.

Figure 3A:
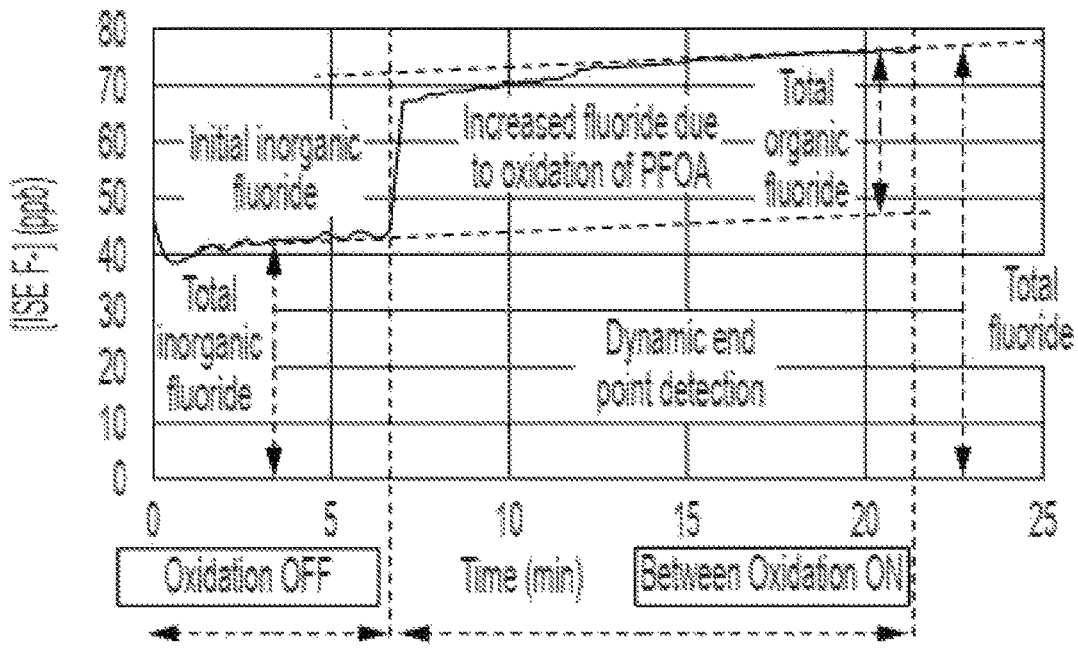
FIG. 3A illustrates example data of a dynamic end point detection of PFOA in the presence of inorganic fluoride.
Figure 3B:
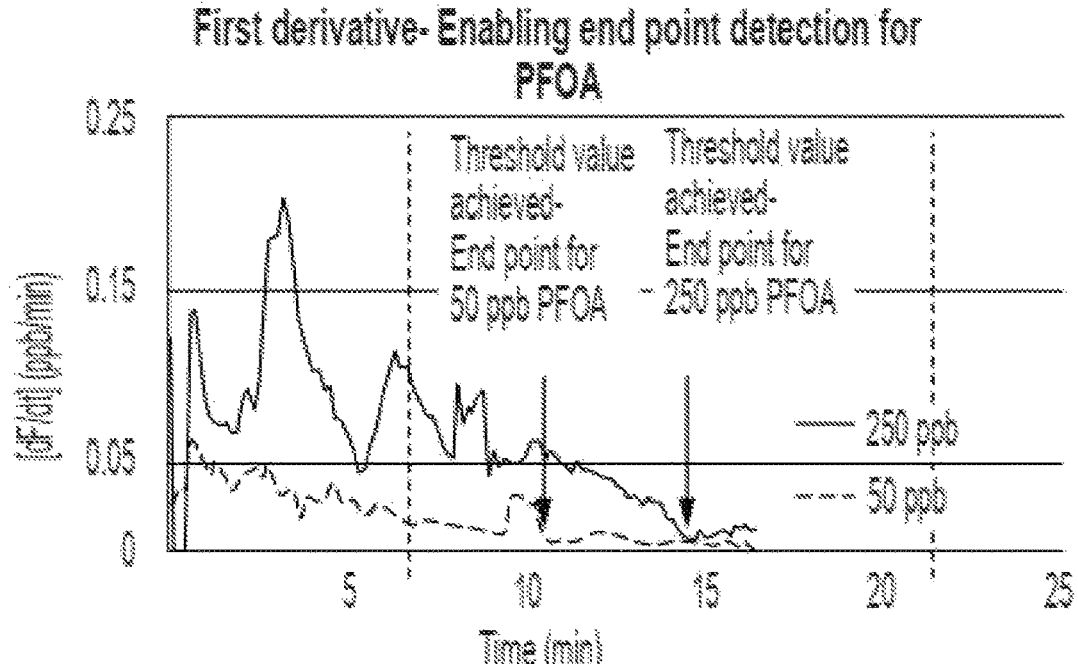
FIG. 3B illustrates example data of the first derivative for end point detection of PFOA.

Referring to FIG. 3A and FIG. 3B, in an embodiment, a dynamic end point determination to ensure digestion completion is illustrated. In FIG. 3A, an example dynamic end point detection is illustrated with 50 ppb (parts per billion) PFOA and 50 ppb of inorganic fluoride. Prior to oxidation a measurement may be taken for initial inorganic fluoride and the total inorganic fluoride. Prior to oxidation, the sample may be circulated between the oxidation cell and the non-oxidation cell in which the oxidation cell does not apply a potential for the initial portion of the protocol. Thereafter, a potential may be applied to the portion of the sample in the oxidation cell. Measurement may be made in the non-oxidation cell or reservoir cell. The oxidation of PFOA increases the concentration of free fluoride in the solution. In an embodiment, the oxidation and oxidation potential may be optimized using the methods described above for dynamic end point detection. The increase in the fluoride ISE signal after oxidation may represent an amount of total organic fluoride component in the sample. Additionally, the sum of the total inorganic fluoride and total organic fluoride signals gives a measurement of total fluoride. A total organic fluoride concentration may be measured from the oxidation of the PFOA compound. Although the specification uses PFOA as an example, other analytes may be measured such as organometals, solid metals, organosulfate, or organophosphate, such as, but limited to iron, nickel, cadmium, mercury, lead, or the like.

In an embodiment, a threshold achievement may be zero, close to zero, or approximately a value of background signal of the measurement system. For example, the background may be the slope of the parallel dashed lines of FIG. 3A. The background may define the asymptote of the measurement system. The background or instrumental related background or system contribution variables may depend on many variables, such as a rate constant of oxidation at the surface of the boron-doped diamond electrode, a penetration depth and diffusional rate of hydroxyl radicals, a total volume of the oxidation cell, and/or an exchange rate of the sample between the oxidation cell and the non-oxidation cell. The method and system may monitor these system contributions. The method or system may determine the variables or system contribution are approaching or exceeding a threshold, range, or value. Such monitoring may alert a user or system of poor performance, required maintenance, recalibration, or the like. The output may be in any forms such as alarms, visual clues, auditory feedback, event loggers, or the like.

Referring to FIG. 3B, in an embodiment, a first derivative of a measurement similar to FIG. 3A is illustrated. In other words, the first derivative of the ppb/minute of fluoride may be plotted over time. The oxidation may be continued until a threshold value is reached. As an example, a threshold value achieved for an end point of 50 ppb PFOA is shown. As another example, an end point for 250 ppb PFOA is also shown. The length of time of a protocol and oxidation potential may be optimized for a given PFOA (or other ISE electrode measurement) concentration. The method and device may reduce experimentation time and power consumption while ensuring complete oxidation.

Figure 4A:
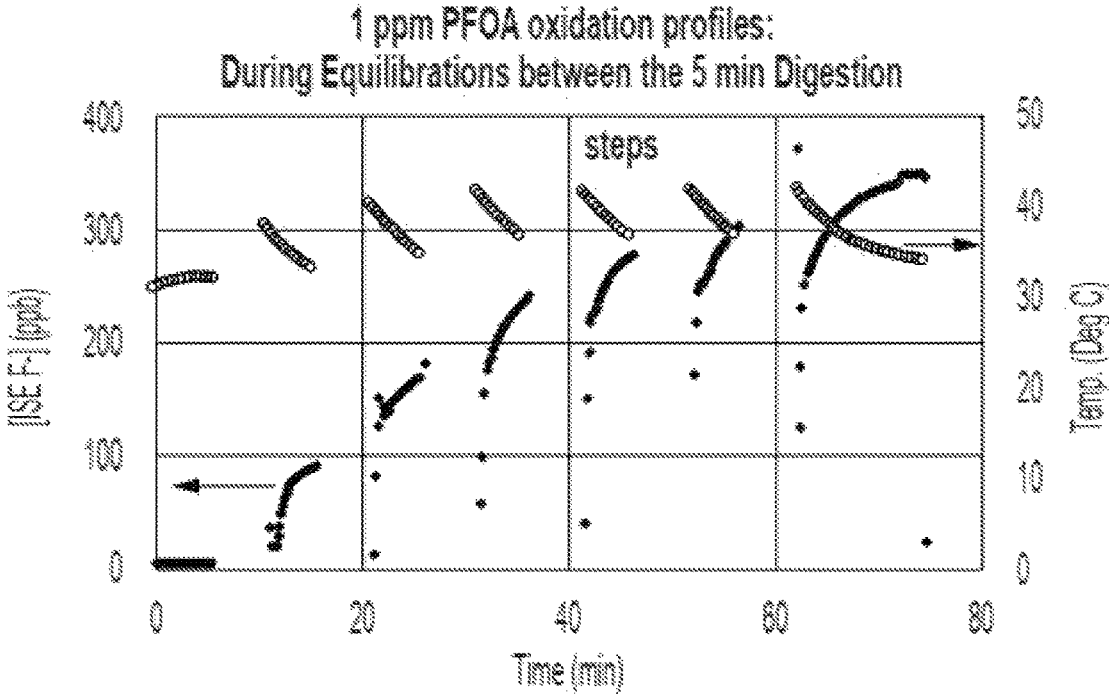
FIG. 4A illustrates example data of PFOA oxidation profiles.
Figure 4B:
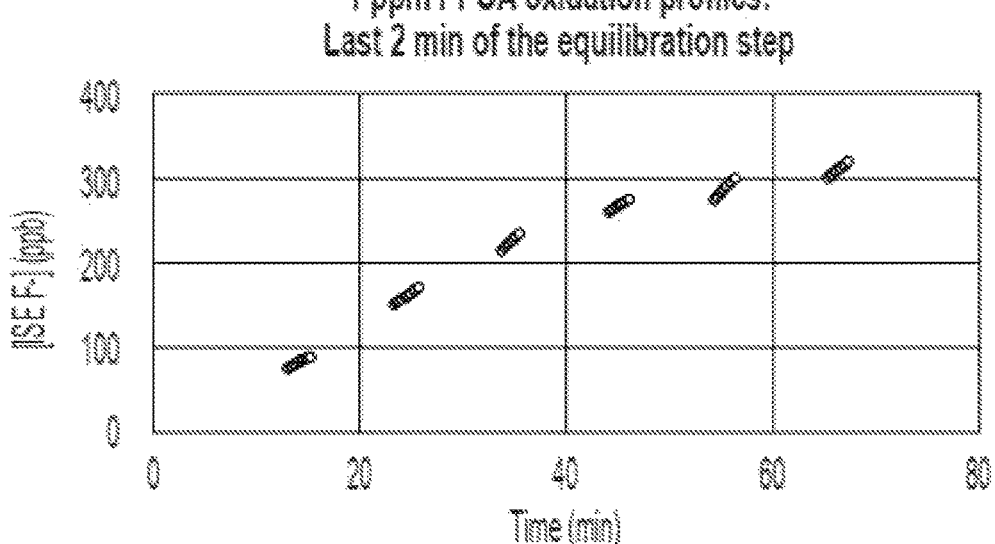
FIG. 4B illustrates example data of PFOA oxidation profiles from a portion of an equilibration step.

Referring to FIG. 4A and FIG. 4B, in an embodiment, sample oxidation profiles are illustrated. In an embodiment, the oxidation may be a stop and start oxidization. When the digestion is stopped a rise in fluoride concentration may be observed. During the digestion, the temperature may rise. In an embodiment, to deconvolute the effect of the oxidation and digestion to fluoride concentration and temperature, the oxidation may be stopped and a fluoride measurement may be recorded. FIG. 4A illustrates a PFOA oxidation profile during equilibrations between a 5 minute digestion. In other words, during the pauses in the digestion, the temperature may cool from the warmer temperature during digestion. This method allows any fluoride concentration component resulting from an increased temperature to be determined. Also, the high potential, for example 60 volts and 300 milliamps, may interfere with the relatively smaller voltage measured at the ISE electrode. FIG. 4B, in an embodiment, illustrates fluoride concentration as measured by an ISE electrode for the last 2 minutes of an equilibration step with 1 ppm of PFOA.

Figure 5A:
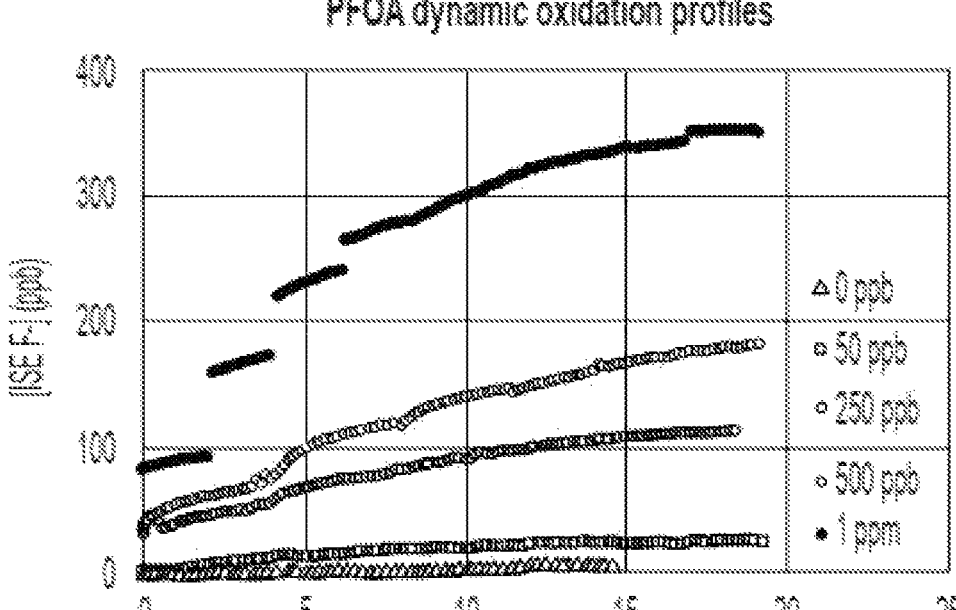
FIG. 5A illustrates example data of PFOA dynamic oxidation profiles for dynamic end point detection.
Figure 5B:
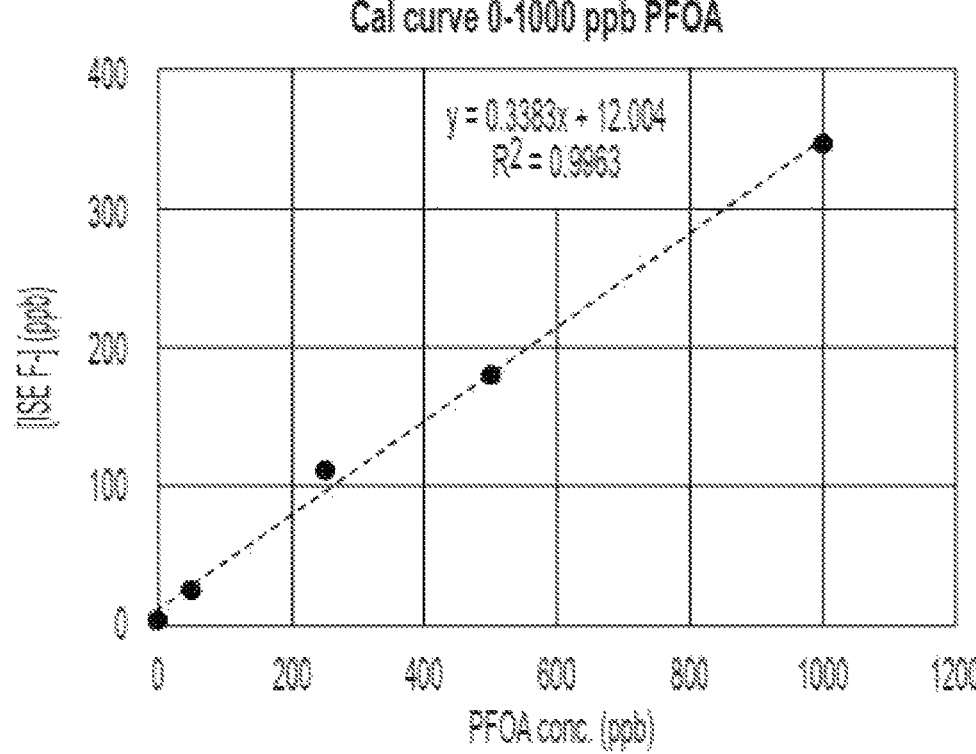
FIG. 5B illustrates example data of a calibration curve for PFOA for dynamic end point detection.

Referring to FIG. 5A and FIG. 5B, in an embodiment, a calibration curve for a dynamic end point detection is illustrated. FIG. 5A illustrates oxidation profiles for PFOA or concentrations illustrated demonstrating fluoride concentration measured by an ISE over time. FIG. 5B illustrates a strong correlation of the data presented in FIG. 5A. In other words, the method and system may be used to measure fluoride concentration over a wide range of PFOA concentrations.

The described method and system may simplify the total organic fluoride, total inorganic, and total fluoride analysis or measurement. For example, elimination of a combustion cartridge is achieved, and hence avoiding the production of hydrogen fluoride gas in the existing adsorbable organic fluoride (AOF). Also, the system and method may produce oxidants without reagents during the digestion process. Additionally, efficiency of hydroxyl radical generation may be higher on the BDD electrodes since there is a weak interaction between the radicals and BDD. The robustness of BDD provides long term stability under harsh conditions, high current densities, fluctuating pH, and complex solution matrices. There are also options to use bipolar electrode configuration to increase oxidation efficiencies. Additionally, the method and system may optimize time and/or power consumption of the measurement process.

At the BDD electrode, PFAS may be directly oxidized to carbon dioxide and fluoride. This is likely to occur for lower chain PFAs compounds. PFAS may be indirectly oxidized by hydroxyl radicals. Hydroxyl radicals may be generated by two ways. Water oxidation may produce hydrogen peroxide or oxygen. Hydrogen peroxide may dissociate to form hydroxyl radicals. Oxygen may form superoxide which then reacts with protons to form hydrogen peroxide. This hydrogen peroxide can then disassociate and produce hydroxyl radicals. In an embodiment, at a counter electrode water may be reduced to form hydroxide anions and hydrogen gas.

The method and system may determine an amount of TOF and/or TIF of the sample. The system, may output an amount of total organic fluoride, total inorganic fluoride, total fluoride, a PFAS concentration, or the like of the sample. The system may also output parameters such as flow rate, amperage, time of digestion, or the like. In an embodiment, an output may be in the form of a display, storing the data to a memory device, sending the output through a connected or wireless system, printing the output, or the like. The system may be automated, meaning the system may automatically output a measurement. The system may also have associated alarms, limits, or predetermined thresholds. For example, if a measured value reaches a threshold, the system may trigger an alarm, alert the system/personnel to a fault, alter the flow of the aqueous solution, or the like. Data may be analyzed in real-time, stored for later use, or any combination thereof. If a measured amount cannot be determined, the system may obtain another sample for testing, output an alarm, send a reminder for maintenance, shunt the flow of sample, or the like.

The aqueous sample may be placed or introduced into an oxidation cell, non-oxidation cell, or the like manually by a user or using a mechanical means, for example, gravity flow, a pump, pressure, fluid flow, or the like. For example, a water sample for testing may be introduced to a chamber by a pump. In an embodiment, there may be one or more chambers in which the one or more method steps may be performed. In an embodiment, valves or the like may control the influx and efflux of the sample into or out of the one or more chambers, if present. Once the sample is introduced to the measurement system, the system may measure a sample automatically.

In an embodiment, the electrodes may be fully or at least partially disposed in the volume of aqueous solution or sample. For example, if the sample is introduced into a chamber having one or more electrodes, the aqueous solution may at least partially cover the one or more electrodes. As another example, the one or more electrodes may be partially disposed within the chamber with the other portion of the electrode outside the chamber. Thus, when the aqueous solution is introduced into the chamber it only covers the portion of the electrodes that are within the chamber.

The various embodiments described herein thus represent a technical improvement to conventional methods and instrument for PFAS, fluoride, or other analyte measurement. Using the techniques as described herein, an embodiment may use a method and device for an instrument for PFAS measurement. This is in contrast to conventional methods with limitations mentioned above. Such techniques provide a better method to construct and an instrument for PFAS measurement.

Figure 6:
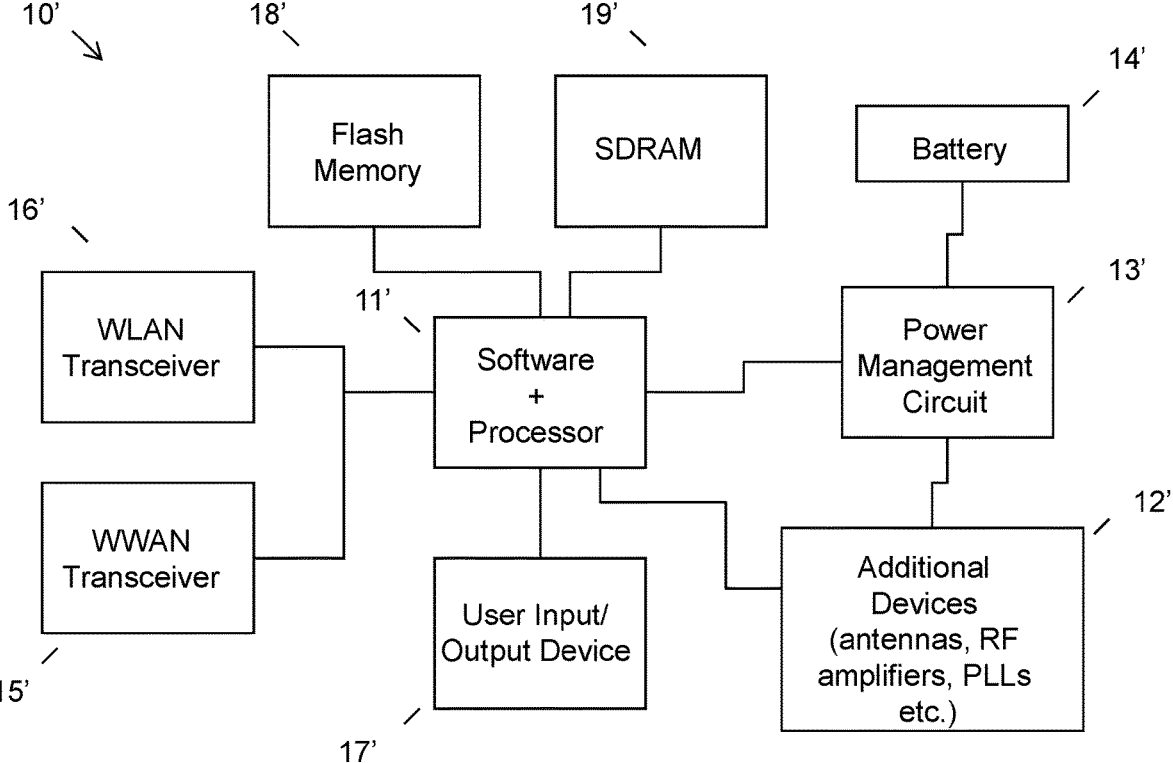
FIG. 6 illustrates an example of computer circuitry.

While various other circuits, circuitry or components may be utilized in information handling devices, with regard to an instrument for fluoride measurement according to any one of the various embodiments described herein, an example is illustrated in FIG. 6. Device circuitry 10' may include a measurement system on a chip design found, for example, a particular computing platform (e.g., mobile computing, desktop computing, etc.) Software and processor (s) are combined in a single chip 11'. Processors comprise internal arithmetic units, registers, cache memory, busses, I/O ports, etc., as is well known in the art. Internal busses and the like depend on different vendors, but essentially all the peripheral devices (12') may attach to a single chip 11'. The circuitry 10' combines the processor, memory control, and I/O controller hub all into a single chip 11'. Also, systems 10' of this type do not typically use SATA or PCI or LPC. Common interfaces, for example, include SDIO and I2C.

There are power management chip(s) 13', e.g., a battery management unit, BMU, which manage power as supplied, for example, via a rechargeable battery 14', which may be recharged by a connection to a power source (not shown). In at least one design, a single chip, such as 11', is used to supply BIOS like functionality and DRAM memory.

System 10' typically includes one or more of a WWAN transceiver 15' and a WLAN transceiver 16' for connecting to various networks, such as telecommunications networks and wireless Internet devices, e.g., access points. Additionally, devices 12' are commonly included, e.g., a transmit and receive antenna, oscillators, PLLs, etc. System 10' includes input/output devices 17' for data input and display/rendering (e.g., a computing location located away from the single beam system that is easily accessible by a user). System 10' also typically includes various memory devices, for example flash memory 18' and SDRAM 19'.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data. The disclosed system may be used in an embodiment of an instrument for fluoride measurement.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a measurement device such as illustrated in FIG. 6, or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for measuring an amount of total organic fluoride of a polyfluoroalkyl substance (PFAS) compound in a sample, comprising:

placing the sample comprising the PFAS compound in a measurement device, wherein the measurement device comprises an oxidation cell and a non-oxidation cell, wherein the oxidation cell comprises a boron-doped diamond electrode;

measuring, using the measurement device, an amount of total inorganic fluoride of the sample before an oxidation;

applying an electrical potential to a portion of the sample in the oxidation cell, wherein the electrical potential oxidizes the PFAS compound;

measuring, using the measurement device, the amount of total organic fluoride of the sample after the oxidation to provide a measurement signal of the total organic fluoride;

determining a first derivative of the measurement signal of the total organic fluoride; and comparing the first derivative to a predetermined value, wherein if the first derivative is greater than the predetermined value then adjusting the electrical potential provided to the oxidation cell.

2. The method of claim 1, wherein the sample circulates between the oxidation cell and the non-oxidation cell.

3. The method of claim 1, wherein the electric potential provides a step wise electrochemical oxidation.

4. The method of claim 1, further comprising determining a second derivative of the measurement signal of the total organic fluoride.

5. The method of claim 1, further comprising periodically turning off the electrical potential to the oxidation cell for a temperature stabilization.

6. The method of claim 1, further comprising periodically turning off the electrical potential to the oxidation cell to reduce an electrical noise as measured by the measurement device.

7. The method of claim 1, further comprising shielding the measurement device from the electrical potential applied during the oxidation.

8. The method of claim 1, further comprising filtering the first derivative to reduce electrical noise.

9. The method of claim 1, wherein the oxidation generates fluoride from a digestion of the PFAS compound using the boron-doped diamond electrode.

10. The method of claim 1, wherein the first derivative approaches an asymptote representing a linear background of the measurement device.

11. The method of claim 1, wherein the first derivative approaching an asymptote defines a dynamic end point of the oxidation.

12. The method of claim 1, wherein a total fluoride content equals a summation of the total inorganic fluoride and the total organic fluoride.

13. The method of claim 1, wherein a duration of the oxidation is determined by the first derivative reaching a threshold value.

14. The method of claim 1, further comprising subtracting a linear background from the measurement of the total inorganic fluoride and from the measurement of the total organic fluoride.

15. The method of claim 14, wherein the linear background comprises system contribution variables, wherein the system contribution variables are selected from the group consisting of: a rate constant of oxidation at the surface of the boron-doped diamond electrode, a penetration depth and diffusional rate of hydroxyl radicals, a total volume of the oxidation cell, and an exchange rate of the sample between the oxidation cell and the non-oxidation cell.

16. The method of claim 1, wherein the measurement device is selected from the group consisting of: an electrochemical device and an optical device.

17. A device for measuring an amount of total organic fluoride of a PFAS compound in a sample, comprising:

a non-oxidation cell;

an oxidation cell comprising an ion selective electrode and a boron-doped diamond electrode; and a processor;

wherein the processor is configured to:

measure an amount of total inorganic fluoride of the sample before an oxidation;

apply an electrical potential to a portion of the sample in the oxidation cell, wherein the electrical potential oxidizes the PFAS compound;

measure the amount of total organic fluoride of the sample after the oxidation to provide a measurement signal of the total organic fluoride;

determine a first derivative of the measurement signal of the total organic fluoride; and compare the first derivative to a predetermined value, wherein if the first derivative is greater than the predetermined value then adjusting the electrical potential provided to the oxidation cell.

* * * * *